2,746,975

BASIC ESTERS AND AMIDES OF 5,6-DIHYDRO-4H-PYRAN-3-CARBOXYLIC ACID AND METHODS OF PRODUCING SAME

John Krapcho, New Brunswick, and William A. Lott, Maplewood, N. J., assignors to Olin Mathieson Chemical Corporation, New York, N. Y., a corporation of Virginia No Drawing. Application January 30, 1952,
Serial No. 269,124

4 Claims. (Cl. 260—345.3)

This invention relates to, and has for its object, the provision of compounds of the general formula [A]

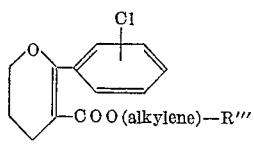

wherein R''' is an amino group; [B] acid-addition salts thereof; [C] quaternary ammonium salts thereof; and [D] methods of preparing [A], [B] and [C].

These compounds are useful and advantageous therapeutic agents, especially antispasmodics. Thus, the hydrochloride of 2-diethylaminoethyl ester of 2-(o-chlorophenyl)-5,6-dihydro-4H-pyran-3-carboxylic acid, a compound representative of group B defined hereinbefore, may be administered in the same general manner (e. g., orally in tablet form) for the same general purpose (e. g., for reduction of rigidity in Parkinson's disease) and with the same general results as the hydrochloride of β-diethylaminoethyl 1 - phenylcyclopentanecarboxylate, an antispasmodic widely used and accepted by the medical profession.

Among the compounds of this invention are: acid-addition salts of bases of the general formula

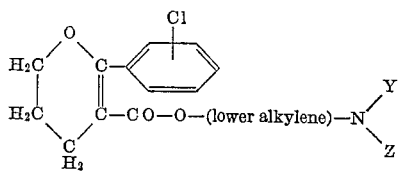

wherein

is a member of the class consisting of

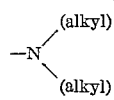

1-piperidyl, 4-morpholinyl and 1-pyrrolidyl; and the quaternary ammonium salts of said bases with alkyl halides.

The bases of this invention are prepared by the method essentially comprising interacting an acid (I) of the general formula

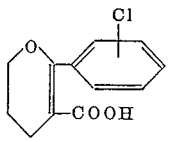

(preferably in its alkali-metal salt form) with a basic aliphatic halide (II) in the presence of a solvent (preferably isopropanol). The utilizable acids I and halides II include, inter alia:

I

2 - (o - chlorophenyl) - 5,6 - dihydro - 4H - pyran - 3-carboxylic acid
2 - (m - chlorophenyl) - 5,6 - dihydro - 4H - pyran - 3-carboxylic acid
2 - (p - chlorophenyl) - 5,6 - dihydro - 4H - pyran - 3-carboxylic acid

[These reactant acids can be obtained by the interaction of a neutral ester of R''—CO—CH$_2$—COOH with a trimethylene halide (preferably bromide) in the presence of an alkaline condensing agent (e. g., sodium ethoxide), and hydrolysis of the resulting ester.]

II 2-diethylaminoethyl bromide
3-diethylaminopropyl chloride
3-(1-piperidyl)propyl chloride
2-(1-pyrrolidyl)ethyl chloride
2-(4-morpholinyl)ethyl chloride
3-diethylamino-2,2-dimethylpropyl chloride
2-(1-piperidyl)ethyl chloride
2-diethylaminoisopropyl chloride
2-dipropylaminoethyl chloride
3-dimethylaminopropyl chloride The esters of this invention may be obtained as free bases or in the form of their acid-addition salts (as, e. g., hydrochlorides, if halogen in the reactant is chlorine). The acid-addition salts may be converted to the free bases in the conventional manner, i. e., by neutralization with alkali; and the free base may be converted to other acid-addition salts by reacting the base with the desired acid in a suitable solvent. The utilizable acids comprise, inter alia: hydrobromic, boric, nitric, lactic, tartaric, citric, succinic, phosphoric, sulfuric, maleic, fumaric and (especially) hydrochloric.

By the addition of alkyl halides, dialkyl sulfates, aralkyl halides or the like, there are obtained in the usual manner quaternary ammonium salts of the aforesaid basic esters and amides A.

The following examples are illustrative of the invention:

Example 1

A. *Ethyl 2-(o-chlorophenyl)5,6-dihydro-4H-pyran-3-carboxylate.*—A cool solution of 8.8 g. sodium in 135 ml. ethanol is treated dropwise with a mixture of 86.5 g. ethyl o-chlorobenzoylacetate [J. Am. Chem. Soc., 37, 1258 (1915)] and 77.2 g. trimethylene bromide. After addition is complete, the mixture is stirred for one hour at room temperature and refluxed for five hours; the cooled mixture is treated dropwise with a solution of 8.8 g. sodium in 135 ml. ethanol and refluxed for six hours. Approximately one-half of the solvent is distilled, the residue cooled and treated with 400 ml. water. The product is extracted with ether and the combined extract washed with 200 ml. portions of water until the aqueous phase is neutral. The ether phase is dried over magnesium sulfate and the solvent evaporated. The residue is fractionated to yield about 72.5 of product, B. P. about 125–130° C./0.25 mm. $n_D^{25}$ 1.5431.

B. 71 g. of ethyl 2-(o-chlorophenyl)-5,6-dihydro-4H-pyran-3-carboxylate is added to a cool solution of 53 g. potassium hydroxide in 1 liter 95% ethanol and the solution refluxed for two hours. About one-half of the solvent is then distilled, the residue cooled and diluted with 1 liter water. After extraction of this solution to remove unreacted ester, the aqueous phase is acidified with dilute sulfuric acid and the liberated acid taken up in ether. The solution of the acid is dried over magnesium sulfate and then concentrated to yield an oil which solidifies on trituration with 100 ml. hexane. This material (about 45 g., M. P. about 125–130° C.) is purified by crystallization from 45 ml. 95% ethanol to yield about 38 g. of pure acid, M. P. about 144–145° C. The product is

[Structure: 2-(o-chlorophenyl)-5,6-dihydro-4H-pyran-3-carboxylic acid with —COOH]

By substituting ethyl p-chlorobenzoylacetate for the corresponding o-chloro compound in A of the above example, 2 - (p - chlorophenyl) - 5,6 - dihydro - 4H-pyran-3-carboxylic acid is prepared. This acid melts at about 171° C. with decomposition.

Example 2

2.78 g. of sodium is dissolved in 500 ml. of isopropyl alcohol, cooled and added to 29.0 g. of 2-(o-chlorophenyl) - 5,6 - dihydro - 4H - pyran - 3 - carboxylic acid. The resulting slurry is stirred for thirty minutes at room temperature and then treated with 16.5 g. of 2-diethylaminoethyl chloride. After the resulting mixture has been refluxed for eight hours, the solvent is evaporated under reduced pressure and the residue treated with 50 ml. of water. The base is then extracted with ether and dried over magnesium sulfate. The solvent is evaporated and the residue fractionated to yield the free base, which weighs about 35.1 g., B. P. about 155–160° C./0.3 mm., $n_D^{25}$ 1.5345. The base (26.15 g.) is dissolved in 1 liter ether and treated with a slight excess of hydrogen chloride to yield about 29 g. of a colorless precipitate, M. P. about 111–113° C. After crystallization from 70 ml. butanone, the product weighs about 24.5 g., M. P. about 112–114° C. It is

[Structure: —CO—O—CH$_2$—CH$_2$—N(C$_2$H$_5$)$_2$·HCl]

The hydrochloride of the corresponding p-chloro compound melts at about 114–116° C.; and the free base, the 2-diethylaminoethyl ester of 2-(p-chlorophenyl)-5,6-dihydro - 4H - pyran - 3 - carboxylic acid, boils at about 176–178° C./0.4 mm.

Example 3

6.43 g. of the base, prepared in Example 2, is dissolved in 25 ml. acetone and treated with 4.25 g. methyl iodide. After standing at room temperature for five days, the solution is diluted with 200 ml. ether and the resulting precipitate (10 g.) is purified by crystallization from 80 ml. butanone. The product, which weighs about 8.0 g., and melts at about 114–116° C., is

[Structure: —CO—O—CH$_2$—CH$_2$—N(C$_2$H$_5$)$_2$CH$_3$·I]

The invention may be variously otherwise embodied within the scope of the appended claims.

We claim:
1. A compound of the class consisting of: bases of the general formula

[Structure: —COO—(lower alkylene)—R''']

wherein R''' is a member of the group consisting of

—N(lower alkyl)(lower alkyl)

1-piperidyl, 1-pyrrolidyl and 4-morpholinyl; acid-addition salts of said bases; and quaternary ammonium salts of said bases.

2. Acid-addition salts of a base of the general formula:

[Structure: —COO—(lower alkylene)—R''']

wherein R''' is a member of the group consisting of

—N(lower alkyl)(lower alkyl)

1-piperidyl, 1-pyrrolidyl and 4-morpholinyl.

3. Quaternary ammonium salts of a base of the general formula:

[Structure: —COO—(lower alkylene)—R''']

wherein R''' is a member of the group consisting of

—N(lower alkyl)(lower alkyl)

1-piperidyl, 1-pyrrolidyl and 4-morpholinyl.

4. An acid-addition salt of a base of the general formula:

[Structure: —COO—(lower alkylene)—N(lower alkyl)(lower alkyl)]

References Cited in the file of this patent
UNITED STATES PATENTS
2,436,645   Hawkins _____ Feb. 24, 1948